June 20, 1933.  T. C. CROSSMAN  1,914,595
BRAKE RIGGING
Filed July 2, 1932
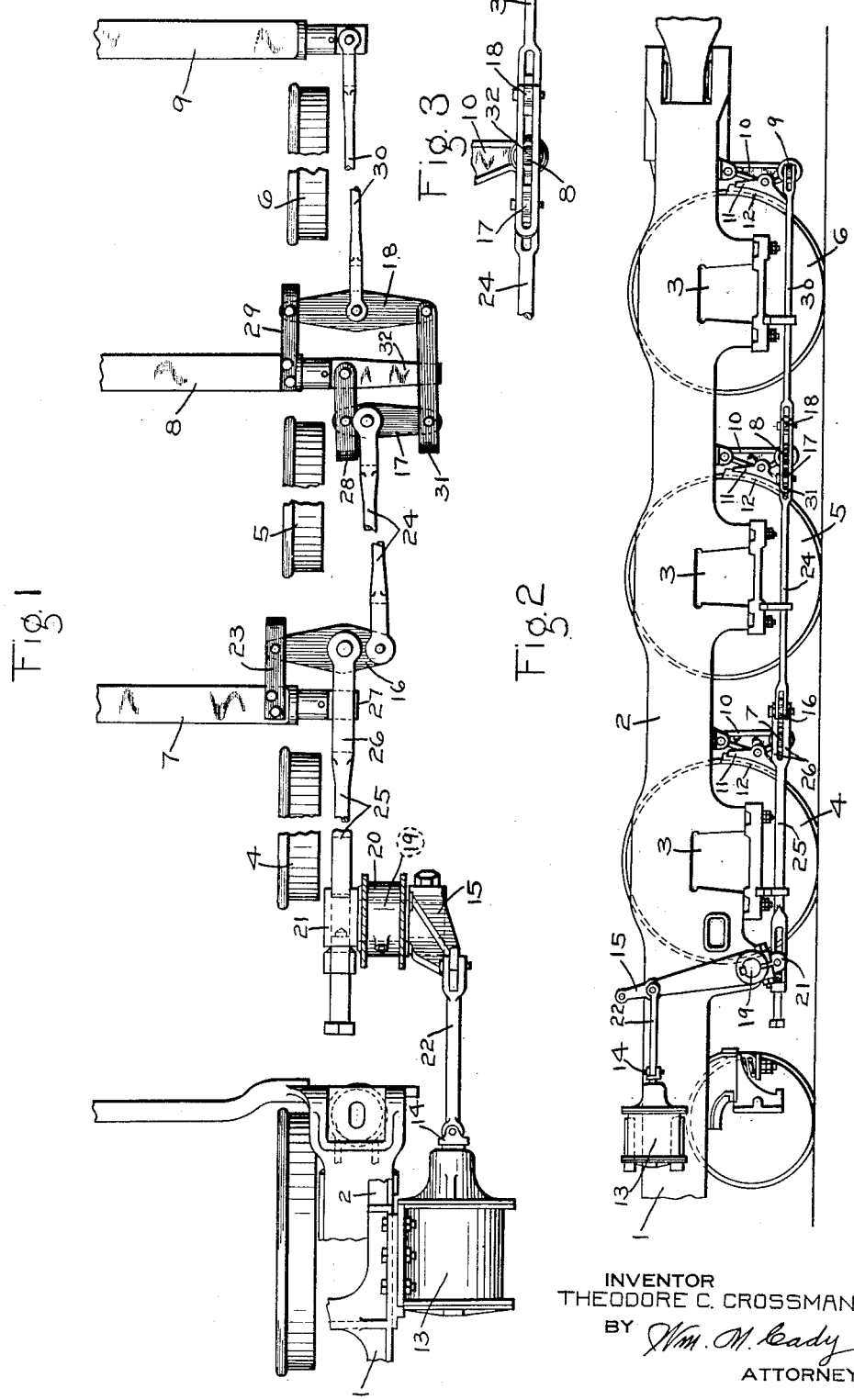
INVENTOR
THEODORE C. CROSSMAN.
BY Wm. N. Cady
ATTORNEY Patented June 20, 1933

1,914,595

UNITED STATES PATENT OFFICE

THEODORE C. CROSSMAN, OF ST. LOUIS, MISSOURI, ASSIGNOR TO THE AMERICAN BRAKE COMPANY, OF ST. LOUIS, MISSOURI, A CORPORATION OF MISSOURI

BRAKE RIGGING

Application filed July 2, 1932. Serial No. 620,562.

This invention relates to brake rigging for railway rolling stock and more particularly to brake rigging for locomotives or car trucks.

Heretofore, in railway vehicle construction, it has been the usual practice to mount the brake rigging between the vehicle wheels and with the rigging thus positioned, it has been found that it is not readily accessible for inspection and repair and that it interferes with the inspection and repair of adjacent parts of the vehicle. When the brake rigging is to be mounted between the wheels it has been found very difficult to provide sufficient clearance to permit the proper movement of the brake rigging parts without interference with or by adjacent parts of the vehicle.

The principal object of my invention is to provide an improved railway vehicle brake rigging which will be so located in a plane outside of the plane of the vehicle wheels that the above mentioned difficulties will not be experienced.

Another object of my invention is to provide a brake rigging having a novel equalizing mechanism embodied therein.

Other objects and advantages will be apparent from the following more detailed description of the invention.

In the accompanying drawing; Fig. 1 is a plan view of a brake rigging constructed and positioned according to my invention, portions of the truck or locomotive frame being broken away to more clearly illustrate the invention; Fig. 2 is a side elevational view, on a reduced scale, of a portion of a locomotive frame and of the brake rigging associated therewith; and Fig. 3 is a detail side elevational view of the equalizing portion of the rigging.

In the drawing, I have illustrated my invention in connection with a locomotive frame 1 which may comprise the usual spaced side members 2 suitably connected transversely of the frame by the usual cross members (not shown).

Each side member 2 is provided with openings 3 for the reception of the usual axle journalling means (not shown). The vehicle wheels 4, 5 and 6 are mounted on axles (not shown) in the usual manner and are located between the side members 2.

The brake rigging comprises brake or cross connector beams 7, 8 and 9 which extend transversely of the frame and which are each of such a length that they extend outwardly beyond the plane of the wheels.

At each side of the frame, the beam 7 passes between the wheels 4 and 5, and the beam 8 passes between the wheels 5 and 6 while the beam 9 is positioned beyond the wheel 6.

The beams are movably supported adjacent each of their ends from the truck frame 1 by means of hanger levers 10, said hanger levers having operatively mounted thereon brake shoe heads 11 carrying brake shoes 12 for engagement with the vehicle wheels.

The brake rigging also comprises two sets of operatively connected rods and levers for actuating said beams to move the hanger levers 10 and brake heads 11 and thereby the brake shoes 12 into engagement with the vehicle wheels. One of these sets of rods and levers is located at each side of the frame and is adapted to be actuated by a brake cylinder device secured to one side member, said brake cylinder device comprising the usual cylinder portion 13, piston (not shown) and a push rod 14 operated by the piston.

Each set of rods and levers comprises a vertically disposed brake cylinder lever comprising an arm 15, a shaft 19 and an arm 21 and also comprises horizontally disposed equalizing levers 16, 17 and 18.

The lower end portion of the brake cylinder lever arm 15 is secured to the outer end of a short cross shaft 19, which shaft, intermediate its ends, is journalled in a bearing 20 integral with a side member 2 of the frame, and secured to the inner end of this shaft, is a downwardly extending lever arm 21.

The upper end of the brake cylinder lever is operatively connected with an extension 22 of the adjacent brake cylinder push rod 14.

The horizontally disposed lever 16 is located adjacent the beam 7 and in substantially the same horizontal plane as the beam. The inner end of this lever is pivotally connected to a member 23 secured to the beam 7 and the outer end is operatively connected to the lever 17 intermediate its ends by a rod 24.

The lever 16, intermediate its ends, is operatively connected with the arm 21, secured to the shaft 19, by a rod 25, there being a slack adjusting mechanism interposed between and cooperating with the rod and arm and which is operable to take up slack in the rigging.

The end portion of the rod 25 which is connected to the lever 16 is preferably in the form of a jaw comprising vertically spaced jaw members 26 between which the lever passes.

The outer ends 27 of the beam 7, in the present embodiment of the invention, are each of rectangular form in cross section and each end portion passes between the spaced jaw members 26 of an adjacent rod 25, the connection between the end of the beam and the jaw members being such that the beam will support the rod and free movement of the beam and rod 25 relative to each other longitudinally of the frame is permitted.

It will here be noted that the rod 25 and member 23 support the lever 16 and through the lever also support the end of the rod 24 connected to the outer end of the lever.

The only clearance provided between the jaw members 26 and the end 27 of the beam is that required to permit the free relative movement between the beam and jaw members and since this clearance will be slight, the jaw members will prevent the beam from tilting and thus prevent undue binding action between the lever and the brake parts pivotally connected therewith.

The lever 17 is positioned at the side of the beam which faces the beam 7 and the lever 18 is positioned at the other side of the beam, said levers and beams being in the same horizontal plane with each other.

The lever 17 is wholly outside of the plane of the adjacent wheels and has its inner end pivotally connected to the outer end of a link 28, the inner end of said link being connected to the end portion of the beam 8. The outer end of the lever 17 is operatively connected to the outer end of the lever 18 by means of a link 31, the inner end of the lever 18 being pivotally connected to a member 29 which is secured to the beam 8.

The lever 18 intermediate its ends is operatively connected to the beam 9 by means of a rod 30.

The link 31 comprises vertically spaced top and bottom portions between which the adjacent outer end 32 of the beam 8 extends, said end 32, in cross section, being of rectangular form. The end 32 of the beam is in supporting engagement with the link 31 and the beam and link are free to move relative to each other in directions longitudinally of the frame.

It will here be noted that the lever 17 is supported by the beam 8 through the medium of the member 28 and the link 31 and that the lever 18 is supported by the beam through the medium of the member 29 and the link 31.

The clearance between the end of the beam and the link 31 is that required to permit free relative movement between these brake elements, and since this clearance is slight, the link will prevent the beam from tilting.

It will be seen that the levers 17 and 18 and their connection with each other and with the beam 8 constitute a simple and effective equalizing mechanism the major portion of which is located outside of the plane of the adjacent wheels, the inner end portion of the lever being the only part of the mechanism which extends into or intersects the plane of the wheels.

In operation, when fluid under pressure is supplied to the brake cylinder devices, the push rods 14 are moved outwardly, i.e., toward the right hand from their normal release positions and, through the medium of the push rod extensions 22 and the brake cylinder lever arms 15, actuate the brake riggings and beams to apply the brake shoes to the treads of the wheels.

To release the brakes, fluid under pressure is released from the brake cylinder devices in the usual manner so that the release springs (not shown, but contained in the brake cylinder portions) act through the medium of the rods 14 and brake cylinder lever arms 15 to effect the releasing movement of the several parts of the brake riggings.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a lever operatively connected to one of the beams and first mentioned lever, and means for actuating the last mentioned lever.

2. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a lever operatively connected to one of the beams, means operatively connecting said levers, and means for actuating the last mentioned lever.

3. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a lever operatively connected to one of the beams, means operatively connecting said levers, means supported on the last mentioned beam operatively connecting said levers, and means for actuating the last mentioned lever.

4. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a lever operatively connected to one of the beams, means slidably supported on the last mentioned beam and operatively connecting said levers, and means for actuating the last mentioned lever.

5. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a horizontally disposed lever operatively connected at its inner end to one of the beams and operatively connected intermediate its ends to the other of said beams, another horizontally disposed lever operatively connected at its inner end to the first mentioned beam, means operatively connecting the outer ends of said levers, and means for actuating the last mentioned lever.

6. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a horizontally disposed lever operatively connected at its inner end to one of the beams and operatively connected intermediate its ends to the other of said beams, another horizontally disposed lever operatively connected at its inner end to the first mentioned beam, means supported by the adjacent end of the first mentioned beam and operatively connecting the outer ends of said levers, and means for actuating the last mentioned lever.

7. In a brake rigging, the combination with a frame and a plurality of pairs of wheels carrying said frame, of a brake beam located at one side of each of two of said pairs of wheels, and a system of operatively connected brake elements for actuating said brake beams, said system comprising a lever operatively connected to both brake beams, a plurality of horizontally disposed levers located one on each side of one of the beams and operatively connected to said beam and to each other, means for operatively connecting one of said levers to the other brake beam, and means for actuating the other of said levers.

8. In a brake rigging, the combination with a truck frame and a plurality of pairs of wheels supporting said frame, of a brake beam located at one side of each of two of said pairs of wheels and supported by said frame, and two systems of operatively connected brake elements for actuating both of the brake beams, one set of which is located at each side of the truck frame, each set of elements comprising a horizontally disposed lever located at one side of one of the beams and operatively connected to both of the beams, a horizontally disposed lever located at the other side of the first mentioned beam and operatively connected to the beam and to the other of said levers outside of the plane of the adjacent wheels, and means for actuating the last mentioned lever.

9. In a brake rigging, the combination with a truck frame and a plurality of pairs of wheels supporting said frame, of a brake beam located at one side of each of two of said pairs of wheels and supported by said frame, and two systems of operatively connected brake elements for actuating both of the brake beams, one set of which is located at each side of the truck frame, each set of elements comprising a horizontally disposed lever located at one side of one of the beams and operatively connected to both of the beams, a horizontally disposed lever located at the other side of the first mentioned beam outside of the plane of the adjacent wheels and operatively connected to the other of said levers, and means for actuating the second mentioned lever.

10. In a brake rigging, the combination with a truck frame and a plurality of pairs of wheels supporting said frame, of a brake beam located at one side of each of two of said pairs of wheels and supported by said frame, and two systems of operatively connected brake elements for actuating both of the brake beams, one set of which is located at each side of the truck frame, each set of elements comprising a horizontally disposed lever located at one side of one of the beams and operatively connected to both of the beams, a horizontally disposed lever located at the other side of the first mentioned beam, means located outside of the plane of adjacent wheels supported by the adjacent end of the first mentioned beam and operatively connecting said levers, and means for actuating the second mentioned lever.

11. In a brake rigging, the combination with a truck frame and a plurality of pairs of wheels supporting said frame, of a brake beam located at one side of each of two of said pairs of wheels and supported by said frame, and two systems of operatively connected brake elements for actuating both of the brake beams, one set of which is located at each side of the truck frame, each set of elements comprising a horizontally disposed equalizer lever located at one side of one of the beams and having its inner end operatively connected to the beam, a rod located in a plane outside of the plane of the adjacent wheels having one of its ends connected to the other brake beam and its other end connected to the lever intermediate the ends of the lever, another lever located at the other side of the first mentioned beam and outside of the plane of said adjacent wheels having its inner end operatively connected to the first mentioned beam, means operatively connecting the outer ends of said levers, and means for actuating the second mentioned lever.

12. In a brake rigging, the combination with a truck frame and a plurality of pairs of wheels supporting said frame, of a brake beam located at one side of each of two of said pairs of wheels and supported by said frame, and two systems of operatively connected brake elements for actuating both of the brake beams, one set of which is located at each side of the truck frame, each set of elements comprising a horizontally disposed equalizer lever located at one side of one of the beams and having its inner end operatively connected to the beam, a rod located in a plane outside of the plane of the adjacent wheels having one of its ends connected to the other brake beam and its other end connected to the lever intermediate the ends of the lever, another lever located at the other side of the first mentioned beam and outside of the plane of said adjacent wheels having its inner end operatively connected to the first mentioned beam, means operatively connecting the outer ends of said levers, and means located in a plane outside of the plane of said adjacent wheels for actuating the second mentioned lever.

In testimony whereof I have hereunto set my hand, this 30th day of June, 1932.

THEODORE C. CROSSMAN.